United States Patent Office.

CARL GUSTAV HAGEMANN AND FRIEDRICH OTTO CORNELIUS ZIMMERMANN, OF LUDWIGSHAFEN, GERMANY.

MANUFACTURE OF CELLULOID.

SPECIFICATION forming part of Letters Patent No. 657,535, dated September 11, 1900.

Application filed June 25, 1898. Serial No. 684,503. (No specimens.)

*To all whom it may concern:*

Be it known that we, CARL GUSTAV HAGEMANN and FRIEDRICH OTTO CORNELIUS ZIMMERMANN, of Ludwigshafen-on-the-Rhine, Germany, have invented certain new and useful Improvements in the Manufacture of Celluloid; and we do hereby declare the following to be a full, clear, and exact description of the invention, such as will enable others skilled in the art to which it appertains to make and use the same.

This invention relates to the manufacture of celluloid, which, as is well known, consists, essentially, of nitrocellulose and camphor, which latter imparts the required plasticity to nitrocellulose. It is also well known that celluloid is a highly-combustible substance which is not only readily ignited, but burns with great violence. Furthermore, the manufacture of celluloid, as is well known, is fraught with great danger, while the cost of the substance is comparatively high.

This invention has for its object, primarily, the production of a practically non-inflammable and non-combustible celluloidal body of any desired degree of plasticity, the manufacture of which is free from danger, while the cost of the product is materially reduced.

The primary object of this invention we attain by molecularly combining with nitrocellulose a hydrate or hydroxid of a metal, and this is best effected by incorporating with a solution of nitrocellulose a concentrated solution of the salt of a metal, then precipitating from said salt the hydroxid by chemically decomposing the same by treating the compound with a correspondingly-concentrated solution of a salt of a metal of the alkalies having the property of neutralizing the compound, as a solution of caustic soda, after which the solvent for the nitrocellulose as well as the soluble products formed under the action of the precipitant are removed, the remaining compound being then dried and gelatinized in the usual manner, with or without the addition of camphor. In some cases we also incorporate with the compound an oleaginous body, preferably castor-oil, when we desire to obtain a smooth and ductile final product, the oil being incorporated with the nitrocellulose solution before the incorporation therewith of the hydrate or hydroxid of a metal. In order to remove all danger of explosion, we convert the nitrocellulose while wet into celluloid or into a celluloidal body, which we have called "hydrocellite," as will hereinafter appear. We are thus enabled to save the expense involved in first drying the nitrocellulose.

In carrying out our invention we dissolve the nitrocellulose while wet (containing fifty per cent., more or less, water) in a suitable solvent, as acetone, so as to form a semifluid or more or less doughy mass. With this mass we incorporate a concentrated aqueous solution of a salt of a metal—as, for instance, a sulfate of alumina—which may be done by trituration, kneading, or otherwise, whereby we obtain a homogeneous plastic transparent compound. With this compound we incorporate a concentrated solution of a salt of an alkali metal having the property of neutralizing such compound—as, for instance, caustic soda—which is preferably gradually added to and incorporated with the compound by trituration, kneading, or otherwise until the compound is neutralized, which can readily be ascertained by the fact that the mass becomes almost suddenly more or less crumbly or friable, while the hydroxid of alumina is precipitated, and thus molecularly and quantitatively combined with the nitrocellulose, as clearly shown by the following formula:

$$Al_2(SO_4)_3 + (6Na-OH = Al_2(OH)_6 + 3Na_2SO_4.$$

The crude hydrocellite thus obtained and which consists, essentially, of hydrate of alumina, sodium sulfate, (Glauber salt,) nitrocellulose, and water is then freed from sodium sulfate and acetone by washing with water, then freed from moisture by pressure or centrifugal action, leaving the intimately-combined nitrocellulose and hydrate of alumina in a more or less gritty or friable condition, while the solvent and sodium sulfate can be removed from the waste liquor by distillation and crystallization, respectively. The compound of nitrocellulose and hydrate of alumina obtained as described is then dried, gelatinized in the usual manner by means of acetone or a solution of camphor in acetone or a solution of camphor in alcohol or the like, and then molded into any desired form. The degree of plasticity of the final product depends, of course, upon the proportion of camphor incorporated therewith. On the other hand, in the absence of camphor the final product is a very hard one, possessing but little plasticity when heated. If it is desired to obtain a very smooth ductile final product, an oleaginous body, preferably castor-oil, is mixed with the solution of nitrocellulose before the incorporation therewith of the hydrate or hydroxid of a metal. In the following examples we have given proportions of ingredients which have yielded excellent results, the parts being given by weight:

Hydrocellite without camphor or oil: nitrocellulose, seventy parts; hydrate of alumina, thirty parts.

Hydrocellite without oil: nitrocellulose, fifty-six parts; hydrate of alumina, twenty-four parts; camphor, twenty parts.

Hydrocellite without camphor: nitrocellulose, sixty-three parts; hydrate of alumina, twenty-seven parts; castor-oil, ten parts.

Hydrocellite with camphor and oil: nitrocellulose, fifty parts; hydrate of alumina, twenty parts; camphor, twenty parts; castor-oil, ten parts.

The proportions of concentrated solutions of the salt of alumina and caustic soda are determined by well-known stoicheiometric rules, due consideration being had of the degree of purity of the chemicals.

Hydrocellite can be colored in the same manner as celluloid, as the hydrate of alumina fixes colors.

In the process described and as hereinbefore stated hydroxids of other metals can be used and intimately incorporated with the nitrocellulose, provided, of course, the salts of the metals can be readily dissolved, while very attenuated solutions do not readily combine with the nitrocellulose.

From what has been said it will readily be seen that hydrocellite has very material advantages over celluloid—as, for instance, its comparatively-low degree of inflammability and its possibility of varying the density of the product and its degree of hardness within very wide limits. The manufacture of the hydrocellite is free from danger, because the nitrocellulose is worked up while in such a wet condition that it cannot even be ignited, much less exploded, while the drying is effected after incorporation therewith of a salt of a metal which renders the compound practically non-explosive at the degree of heat necessary to dry the same, so that the drying operation is also not fraught with danger. Finally, the cost of the hydrocellite is very materially less than that of celluloid, while the range of use of the former is equally as great and in fact greater than that of celluloid.

Having thus described our invention, what we claim as new therein, and desire to secure by Letters Patent, is—

1. The process, which consists in combining with nitrocellulose a hydrate or hydroxid of a metal, for the purpose set forth.

2. The process, which consists in combining a hydrate or hydroxid of a metal with nitrocellulose and gelatinizing the compound, substantially as and for the purposes set forth.

3. The process, which consists in combining a hydrate or hydroxid of a metal with nitrocellulose, and gelatinizing the compound with a nitrocellulose solvent holding camphor in solution, for the purpose set forth.

4. The process, which consists in combining, with a solution of nitrocellulose, a solution of a hydrate or hydroxid of a metal, reacting upon the compound with a solution of an agent capable of neutralizing the same and precipitating the hydroxid, and removing the nitrocellulose solvent and the soluble constituents resulting from the reaction, for the purpose set forth.

5. The process, which consists in molecularly combining, with a solution of nitrocellulose, a solution of a hydrate or hydroxid of a metal, reacting upon the compound with a concentrated solution of a salt of a metal capable of neutralizing said compound, and precipitating the hydroxid, and removing the cellulose solvent and the soluble constituents resulting from the reaction, for the purpose set forth.

6. The process, which consists in combining, with a solution of nitrocellulose, a concentrated solution of a hydrate or hydroxid of a metal, reacting upon the compound with a concentrated solution of caustic soda, removing the cellulose solvent and soluble constituents resulting from the reaction, drying, and gelatinizing the compound, for the purpose set forth.

7. The process, which consists in combining, with a solution of nitrocellulose, a concentrated solution of a hydrate or hydroxid of a metal, reacting upon the compound with a concentrated solution of caustic soda, removing the cellulose solvent and soluble constituents resulting from the reaction, drying, and gelatinizing the compound with a solvent of nitrocellulose holding camphor in solution, for the purposes set forth.

8. The herein-described product consisting essentially of gelatinized nitrocellulose and a hydrate or hydroxid of a metal, substantially as set forth.

In testimony that we claim the foregoing as our invention we have signed our names in presence of two subscribing witnesses.

CARL GUSTAV HAGEMANN.
FRIEDRICH OTTO CORNELIUS ZIMMERMANN.

Witnesses:
JACOB ADRIAN,
FRIEDRICH MARDO.